United States Patent Office 2,721,216
Patented Oct. 18, 1955

2,721,216

N-SUBSTITUTED MANDELANILIDES

Merrill Eugene Speeter, Kalamazoo, Mich., assignor to Bristol Laboratories Inc., Syracuse, N. Y., a corporation of New York No Drawing. Application February 18, 1953, Serial No. 337,654

4 Claims. (Cl. 260—559)

This invention relates to a new class of organic compounds of therapeutic value and methods for the preparation thereof. More particularly the invention relates to N-substituted mandelanilides.

The new compounds may be represented by the following general formula:

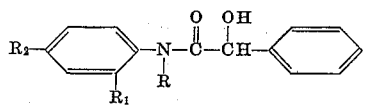

wherein R represents alkyl or aralkyl and $R_1$ and $R_2$ represent hydrogen, halogen, alkoxyl or phenyl.

The compounds of this invention are useful intermediates for the synthesis of medicinal agents and in addition have been found to possess anticonvulsant activity.

The compounds of this invention are prepared by reacting secondary aromatic amines with acetylmandelyl chloride to give acetylmandelanilides which are easily hydrolyzed to mandelanilides.

The following examples will serve to illustrate the invention without limiting it thereto.

EXAMPLE I

*N-methylmandelanilide*

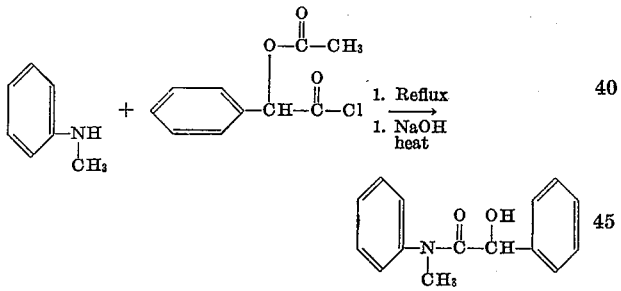

A solution of 75 gm. (0.7 mole) of methylaniline in 800 ml. of benzene was cooled in a cold water bath and 62.5 gm. (0.29 mole) of acetylmandelyl chloride added slowly. The mixture was shaken vigorously during the addition and was then refluxed for two hours. The precipitated methylaniline hydrochloride was filtered and washed well with 500 ml. of benzene. The combined filtrates and washings were extracted with 500 ml. of 1–5 dilute hydrochloride acid, washing with water and concentrated. The heavy oil was taken up in 400 ml. of ethanol and 10 gm. of sodium hydroxide in 100 ml. of water added. The mixture was refluxed four hours, the alcohol taken off under reduced pressure and water added to the oil remaining. Crystallization soon took place. The solid was filtered, washed with water, and recrystallized from isopropanol. Fifty grams (69% yield) of crystals melting at 89°–90° were obtained.

Analysis.—Calculated for $C_{15}H_{15}NO_2$:

|   | Calculated | Found |
|---|---|---|
| C | 74.65 | 74.50 |
| H | 6.26 | 6.33 |

EXAMPLE II

*N-ethylmandelanilide*

Following the exact method used in Example I, 84.8 gm. (0.4 mole) of acetylmandelyl chloride was reacted with 121 gm. (1.0 mole) of ethylaniline. The mandelanilide isolated was recrystallized from Skellysolve B, M. P. 68°–69°. Yield, 94 gm. (93%).

Analysis.—Calculated for $C_{16}H_{17}NO_2$:

|   | Calculated | Found |
|---|---|---|
| C | 75.26 | 75.22 |
| H | 6.71 | 6.84 |

EXAMPLE III

*N-benzylmandelanilide*

Again using the method of Example I, 156 gm. (0.73 mole) of acetylmandelyl chloride were reacted with 269 gm. (1.47 moles) of benzylaniline. After recrystallization from isopropanol, 210 gm. (90% yield) of N-benzylmandelanilide melting at 101°–101.5° were obtained.

Analysis.—Calculated for $C_{21}H_{19}NO_2$:

|   | Calculated | Found |
|---|---|---|
| C | 79.45 | 79.30 |
| H | 6.03 | 5.97 |

EXAMPLE IV

*Mandel-p-chloroanilide*

A mixture of 152.1 g. of mandelic acid and 127.5 g. of p-chloroaniline was heated to 180°–200° for four hours. The mixture was then poured while hot into one liter of isopropyl alcohol. The cooled solution deposited crystals of mandel-p-chloroanilide which melted at 164°–166° C. and could be recrystallized from isopropyl alcohol.

Analysis.—Calculated for $C_{14}H_{12}NO_2Cl$:

|   | Calculated | Found |
|---|---|---|
| C | 64.24 | 64.15 |
| H | 4.62 | 4.69 |

EXAMPLE V

*Mandel-p-anisidide*

Mandelic acid was treated with p-anisidine using the method of Example IV to give crystalline mandel-p-anisidide which melted at 153°–154° C. and could be recrystallized from methanol.

Analysis.—Calculated for $C_{15}H_{15}NO_3$:

|   | Calculated | Found |
|---|---|---|
| C | 70.02 | 70.49 |
| H | 5.88 | 5.84 |

EXAMPLE VI

*Mandel-p-phenylanilide*

Mandelic acid was treated with p-phenylaniline using the method of Example IV to give crystalline mandel-p-phenylanilide which melted at 222°–223° C. and could be recrystallized from methanol.

Analysis.—Calculated for $C_{20}H_{17}NO_2$:

|   | Calculated | Found |
|---|---|---|
| C | 79.19 | 79.10 |
| H | 5.65 | 5.55 |

EXAMPLE VII

*Mandel-o-chloroanilide*

Mandelic acid was treated with o-chloroaniline using the method of Example IV to give crystalline mandel-o-chloroanilide which melted at 80°–82° C. and could be recrystallized from methanol.

*Analysis.*—Calculated for $C_{14}H_{12}NO_2Cl$:

|   | Calculated | Found |
|---|---|---|
| C | 64.24 | 64.04 |
| H | 4.62 | 4.69 |

EXAMPLE VIII

*Mandel-p-chloro-N-methylanilide*

Acetylmandelyl chloride is reacted with N-methyl-p-chloroaniline using the method of Example I to give mandel-p-chloro-N-methylanilide as a white, crystalline solid.

EXAMPLE IX

*Mandel-p-chloro-N-benzylanilide*

Acetylmandelyl chloride is reacted with N-benzyl-p-chloroaniline using the method of Example I to give mandel-p-chloro-N-benzylanilide as a white crystalline solid.

EXAMPLE X

*Mandel-o-chloro-N-ethylanilide*

Acetylmandelyl chloride is reacted with N-ethyl-o-chloroaniline using the method of Example I to give mandel-o-chloro-N-ethylanilide as a white crystalline solid.

EXAMPLE XI

*Mandel-p-methoxy-N-ethylanilide*

Acetylmandelyl chloride is reacted with p-methoxy-N-ethylaniline using the method of Example I to give mandel-p-methoxy-N-ethylanilide as a white crystalline solid.

I claim:

1. A new class of compounds of the general formula

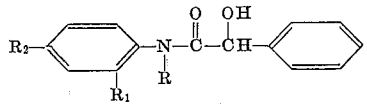

where $R_1$ and $R_2$ represent members selected from the group consisting of hydrogen, halogen, and (lower) alkoxyl and where R represents a member selected from the group consisting of (lower) alkyl and benzyl.

2. A compound of the formula

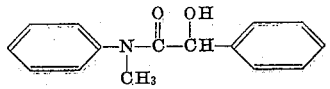

3. A compound of the formula

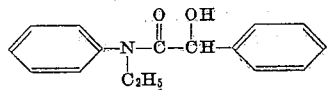

4. A compound of the formula

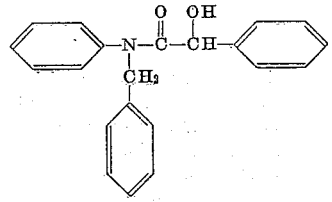

References Cited in the file of this patent

UNITED STATES PATENTS

| 2,009,144 | Miescher et al. | July 23, 1935 |
| 2,320,497 | Wenner | June 1, 1943 |

OTHER REFERENCES

Biedermann: "Ber. deut. Chem.," vol 24 (1891), page 4084.